(12) United States Patent
Ashley et al.

(10) Patent No.: US 7,620,277 B1
(45) Date of Patent: Nov. 17, 2009

(54) FIBER PIGTAILS AND METHOD FOR FABRICATING THE SAME

(75) Inventors: Paul R. Ashley, Toney, AL (US); Michael D. Bramson, Ridgecrest, CA (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 45 days.

(21) Appl. No.: 11/710,123

(22) Filed: Feb. 22, 2007

Related U.S. Application Data

(62) Division of application No. 11/208,120, filed on Aug. 16, 2005, now abandoned.

(51) Int. Cl.
*G02B 6/30* (2006.01)
*G02B 6/36* (2006.01)

(52) U.S. Cl. .......................................... 385/49; 358/91
(58) Field of Classification Search .................... 385/49, 385/91

See application file for complete search history.

(56) References Cited

U.S. PATENT DOCUMENTS

| 5,325,452 | A  | * | 6/1994 | Stein et al. | 385/67 |
| 6,363,201 | B2 | * | 3/2002 | Sherrer et al. | 385/137 |
| 6,728,450 | B2 | * | 4/2004 | Tombling et al. | 385/52 |

* cited by examiner

*Primary Examiner*—Jerry T Rahll
(74) *Attorney, Agent, or Firm*—Brian F. Drazich

(57) ABSTRACT

An optical fiber pigtail and methods of fabricating of the same. The invention also relates to a method of self-alignment of a fiber pigtail and a method of attachment of a fiber pigtail to a surrogate chip.

1 Claim, 5 Drawing Sheets

FIBER PIGTAILS AND METHOD FOR FABRICATING THE SAME

This is a divisional of application Ser. No. 11/208,120, filed Aug. 16, 2005, now abandoned.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention relates to fiber optic pigtails and method for fabricating the same in Inertial Measurement Units (IMU) employing interferometric fiber optic gyroscopes (IFOG) and etched silicon accelerometers.

BRIEF DESCRIPTION OF THE DRAWINGS

It is to be understood that the foregoing general description and the following detailed description are exemplary and explanatory only and are not to be viewed as being restrictive of the present invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS

Figure 1A:
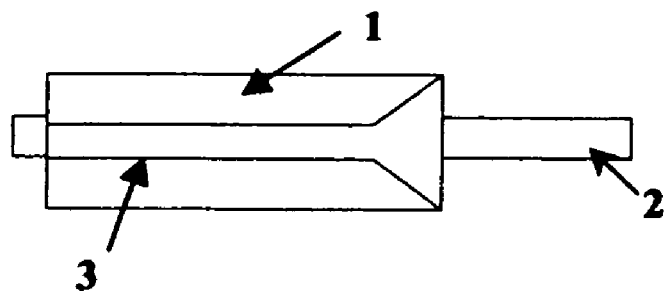
FIGS. 1A-C is a perspective view of a fiber pigtail being fabricated by angled polishing and cleaning, according to embodiments of the invention.

The invention relates to a fiber pigtail and methods of fabricating of the same. The invention relates to a method of fabricating a fiber pigtail including, providing an optical fiber having a first terminal end and second terminal end, providing a ferrule constructed of a rigid material, coupling the ferrule to the first terminal end of the fiber with a bonding means for securing the ferrule to the first terminal end, rotationally aligning the first terminal end of the fiber for polishing at an angle for proper alignment, polishing the first terminal end of the fiber utilizing the ferrule to an angle for minimizing back reflections and dimensioning and configuring the first terminal end of the fiber to be attached to a chip, and cleaning the first terminal end of the fiber. In other embodiments the method of removing the ferrule from the first terminal end of the fiber is performed and the fiber is attached to a handle and the handle/fiber is coupled to a chip. In other embodiments, the ferrule is left attached to the fiber and is then coupled to an integrated optic chip (IOC), hereafter referred to as chip.

In embodiments the bonding means includes, but not limited to, at least one of a thermal bonding compound, bonding compounds, adhesives, glues, and epoxies. The ferrule is removed, in other embodiments by reheating or with a solvent like acetone and use of an ultrasonic cleaner/hot plate, dependent on the bonding means utilized. The ferrule is constructed of materials including, but not limited to, at least one of glass (including borosilicate, soda lime), silicon, machinable ceramics, quartz, metals including steel, plastics, polymers, and kovar. An example of cleaning the first terminal end of the fiber is with acetone and isopropyl solutions in an ultrasonic cleaner.

In embodiments, the invention further comprises a handle constructed of materials including, but not limited to, at least one of glass (including borosilicate, soda lime), semiconductors, silicon, ceramics, quartz, metals including steel, plastics, polymers, and kovar. The chip is constructed of any applicable materials; however, in embodiments of the invention the chip is constructed of polymer material(s).

Another aspect of the invention relates to a method of self-alignment of a fiber to a handle including, providing a fiber pigtail having terminal end and a polished end, providing a handle having an optically flat surface and including a groove to aid in precision holding and desired optical alignment, providing a surrogate chip, providing a means for mounting, wherein the handle and the surrogate chip are placed on the mounting means for aiding in rotational parallel alignment, providing an rotationally aligning means, and aligning rotationally the fiber to the groove of the handle to position the fiber with a desired core size and using the aligning means for precise rotational alignment to desired polarization axis of the fiber with the surface of the handle.

The Norland-61 is applied to the end of the fiber. The fiber is moved back into place and the coupling is maximized and Norland-61 is cured by UV light.

Another aspect of the invention relates to a method of attachment and self-alignment of a fiber pigtail including: providing a pre-aligned fiber pigtail precisely aligned and strategically positioned within a ferrule; providing a chip having a stack and a substrate, wherein the stack includes an upper cladding, a core, and a lower cladding; etching a groove through the stack and the substrate, wherein the etched depth is dimensioned and configured to house the fiber pigtail at a predetermined height for alignment to the waveguide; aligning lithographically width with a waveguide output channel for coupling with the pre-aligned fiber pigtail; coupling and aligning the pre-aligned fiber pigtails by lateral placement and rotational orientation with the chip and adjusting the coincidence of optical reflection of the coupled chip and ferrule/fiber, and bonding edges of the coupled chip and the ferrule/fiber with a securing means for desired alignment of the fiber of the pigtail with the waveguide of the chip.

The handle is constructed of materials including, but not limited to, at least one of glass (including borosilicate, soda lime), semiconductors, silicon, ceramics, quartz, metals including steel, plastics, polymers, and kovar. In embodiments, the means for mounting includes, but is not limited to, at least one of a chuck and rotator.

Yet another aspect of the invention relates to a method of attachment and self-alignment of a fiber pigtail including, providing a pre-aligned fiber pigtail precisely aligned and strategically positioned within the groove, raising the fiber in the groove of the handle, applying a bonding means to length of the fiber, and securing the aligned fiber within the groove of the handle that ensures even distribution of the securing means, providing a chip having a stack and a substrate, wherein the stack includes an upper cladding, a core, and a lower cladding, etching a groove through the stack and the substrate, wherein the etched depth is dimensioned and configured to house the fiber pigtail at a predetermined height for alignment to the waveguide, aligning lithographically the groove width with a waveguide output channel for coupling with the pre-aligned fiber pigtail, coupling and aligning the pre-aligned fiber pigtails by lateral placement and rotational orientation with the groove of the chip and adjusting the coincidence of optical reflection of the coupled chip and handle, and bonding edges of the coupled chip and the handle with a securing means for desired alignment of the fiber of the pigtail with the waveguide of the chip.

To ensure the parallelism of the surfaces of the silicon handle with the modulator chip, reflections of a laser beam off of the two surfaces are observed on a screen at a distance of about 6-8 feet. The laser is mounted just above the sample so that the light is reflected at an angle of about 45 degrees. In embodiments, the aligning means is a white light interferometer having a continuous wavelength spectrum. In other embodiments, the aligning means is a laser.

In embodiments, the etching of a groove through a polymer stack utilizes a deep reactive ion etching system (DRIE) process. In further embodiments, the etching of a groove through a silicon substrate is with a deep reactive ion etching system (DRIE) process. The waveguide material extends beyond the groove for maintaining lateral placement of the fiber onto the chip. The handle of embodiments of the invention are constructed of materials including, but not limited to, at least one of glass (including borosilicate, soda lime), semiconductors, silicon, ceramics, quartz, metals including steel, plastics, polymers, and kovar. The bonding means includes, but is not limited to, at least one of a thermal bonding compound, bonding compounds, adhesives, glues, and epoxies. In embodiments, the chip and stack are constructed of polymer materials. The invention further includes the optic fiber pigtails fabricated by the methods described herein.

The normal fiber pigtailing process for a polymer chip used in devices such as but not limited to phase modulators and transceiver requires the precision fabrication of fiber pigtail terminal parts and a tedious active rotational alignment process. The self-alignment and attachment of the fiber process used in this embodiment eliminates these requirements and only a conventional polishing technique is required.

Pigtails and Method of Fabrication of Pigtails

Figure 1B:
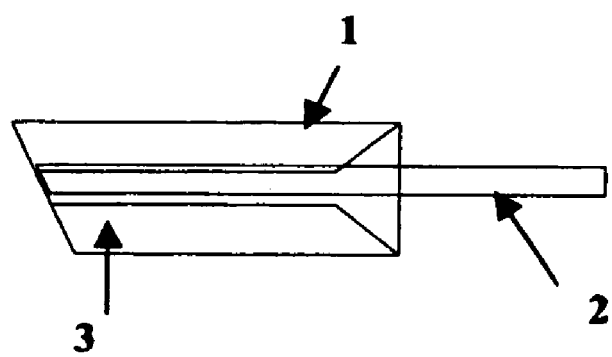
Figure 1C:
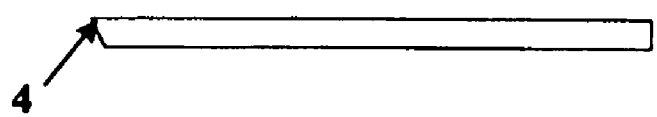

As illustrated in FIGS. 1A-C, the optical fiber is angled polished to the angle needed to minimize the back-reflections. The fiber polishing method that utilizes glass ferrule are employed. A round glass ferrule 1 is temporarily attached to the fiber 2 using a thermal bonding compound, Crystal Bond 3, which is removed by reheating or with a solvent including acetone shown in FIG. 1A. Once the ferrule is in place, the alignment and polishing process is shown in FIG. 1B. After the polishing is complete, the fiber and ferrule are placed in a beaker of acetone and put into an ultrasonic cleaner to help loosen up the crystal bond. When the crystal bond has not released by this point, a hot plate is used to loosen the rest of the crystal bond. The fiber is carefully removed from the ferrule. The fiber is then cleaned thoroughly in acetone and isopropyl in the ultrasonic cleaner. Once the fiber is polished 4, it is ready to be attached and aligned to the silicon handle as shown in FIG. 1C.

When solder is used instead of the thermal bonding adhesive, then the fiber is first coated with metal generally by means of evaporation or sputtering. The metal should be of a type that might be soldered including gold. Solder is applied to the fiber with heat to bond the fiber to a metal surface including a ferrule (if the ferrule is made of metal, for example Kovar) or other structure supporting the fiber.

Method of Self-Alignment of Optic Fiber to the Handle

Figure 2:
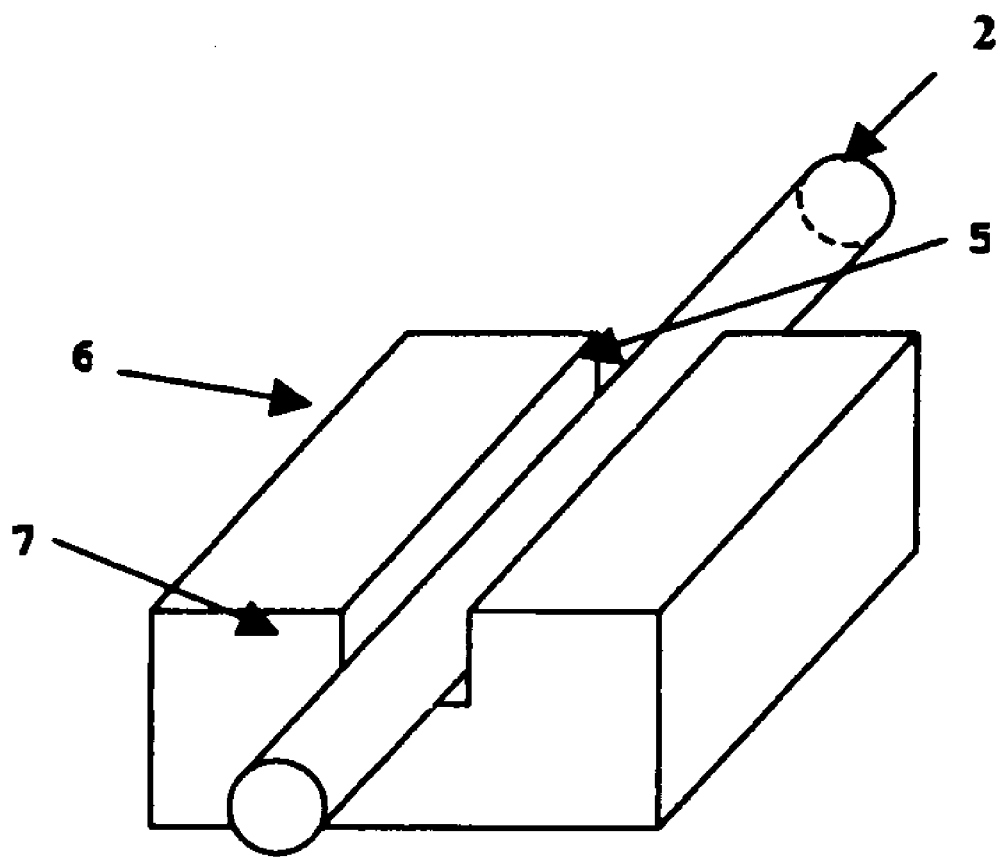
FIG. 2 is a perspective view of a groove of a silicon handle that holds or houses an optical fiber, according to embodiments of the invention.
Figure 3:
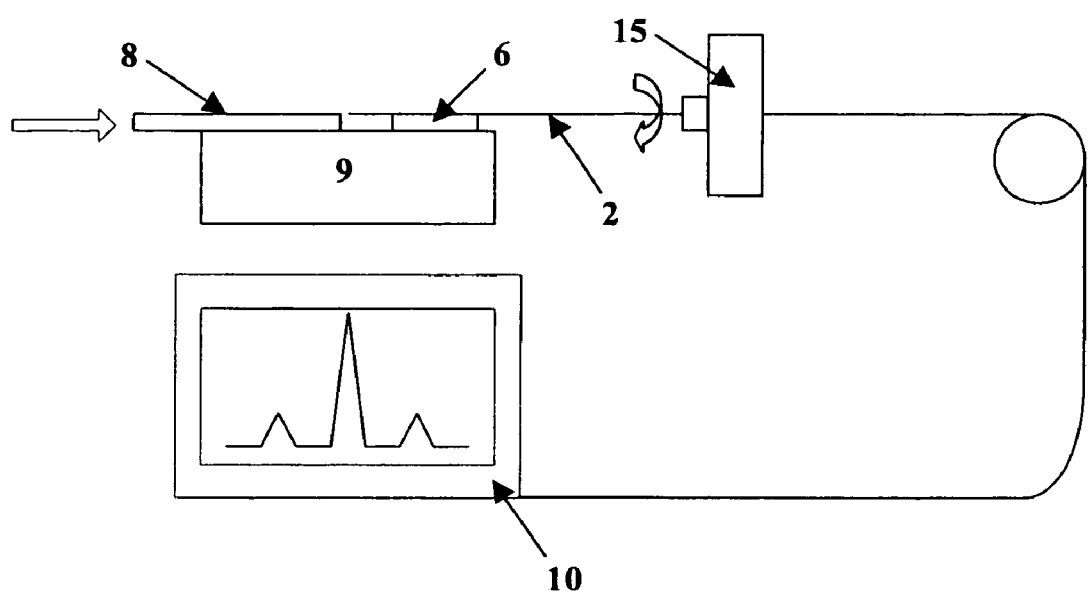
FIG. 3 illustrates a rotational alignment method of self-aligning the optic fiber to a polymer chip, according to embodiments of the invention.
Figure 4:
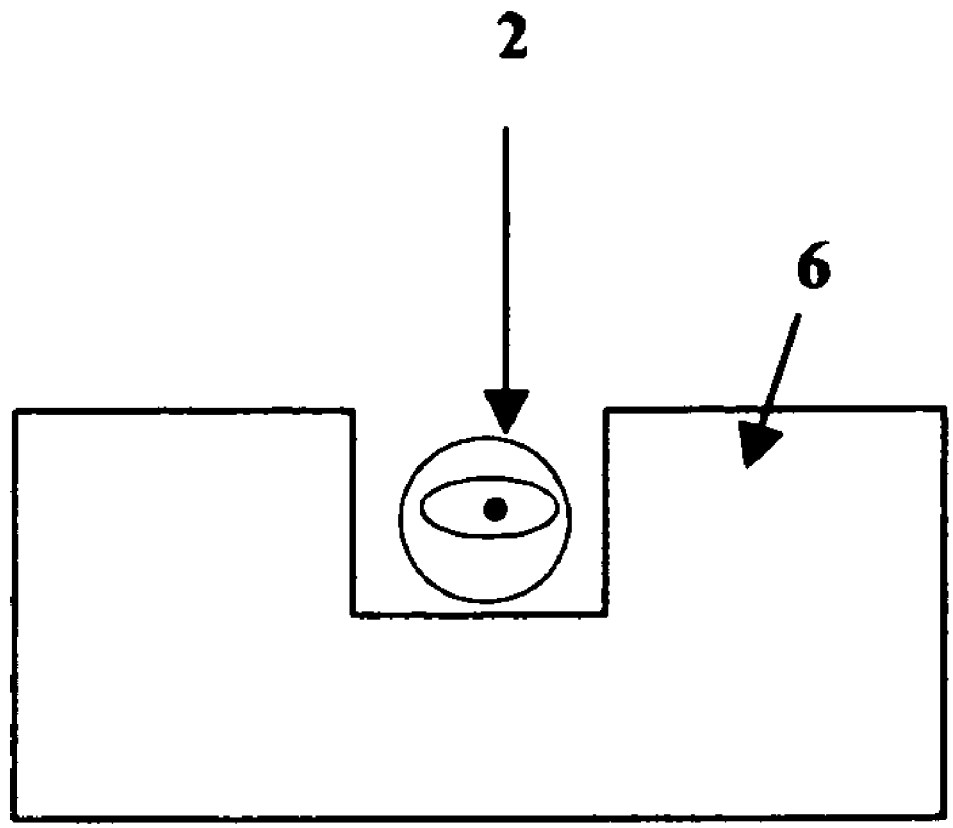
FIG. 4 illustrates when the desired polarization axis of the fiber is adequately aligned with the surface of the handle, according to embodiments of the invention.

Another aspect of the invention relates to a method of self-aligning the optic fiber 2 to a polymer chip. A grove 5 is fabricated on a 5×5×0.5 mm silicon handle 6 to position the fiber 7 with a core size of 80 micron or 125 micron as shown in FIG. 2. A polarization maintaining fiber is precision aligned rotationally to the polarization axis of the fiber using a white light Interferometer technique—(U.S. Pat. No. 5,422, 713, Bi-refringent Waveguide Rotational Alignment Method Using White Light Interferometry by Michael D. Bramson). The rotational alignment is performed with the aid of a surrogate chip 8 which is placed on a common vacuum chuck 9 with the silicon handle to insure the planes of the chip and handle are parallel as shown in FIG. 3. The fiber 2 mounted on a precision fiber rotator 15 is then positioned in the groove in the handle 6 and a white light interferometer with polarizer 10 is used for rotational alignment by looking at the coherence spectrum of the output. When the alignment is complete, the desired polarization axis of the fiber is adequately aligned with the surface of the handle as shown in FIG. 4. The fiber is raised slightly to permit the epoxy to be applied along the length of the fiber and the fiber is lowered into place on the silicon handle.

Method of Attachment and Alignment of the Fiber Pigtail to the Polymer Chip

Figure 5:
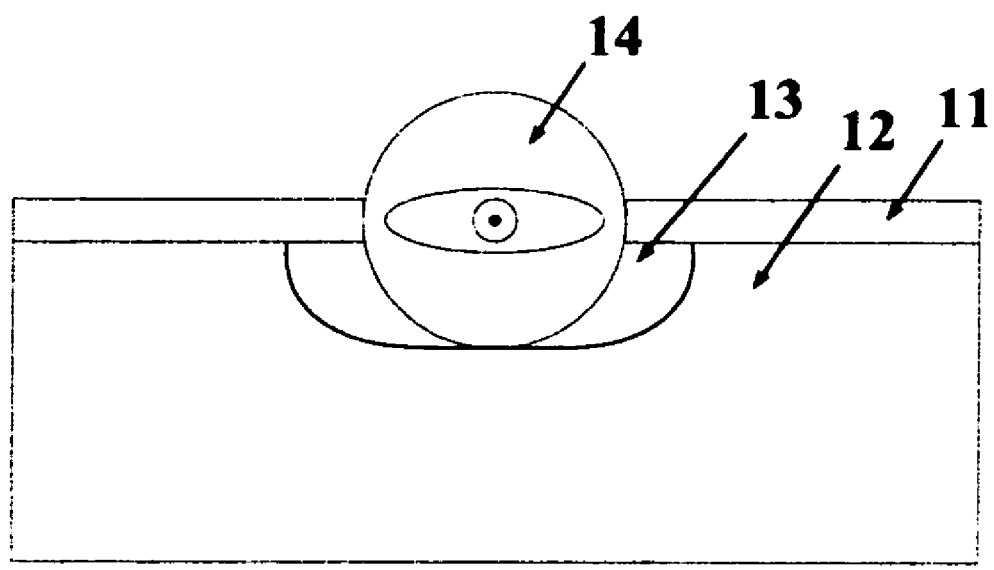
FIG. 5 is a cross-sectional view of a polymer chip having a groove etched through the polymer stack of an upper cladding, core, and lower cladding into the silicon, according to embodiments of the invention.

The polymer chip is constructed with a groove etched through the polymer stack 11 of upper cladding, core, and lower cladding, and into the silicon substrate 12 as shown in FIG. 5. The polymer groove 13 is lithographically aligned to the waveguide output channel with a groove width to provide a tight fit to the polished fiber 14 with diameter of about 80 or 125 micron. The silicon is etched with $SF_6$ using the inductively coupled plasma (ICP) deep reactive ion etching system (DRIE) process. The etch depth is constructed to hold or house the fiber (about 80 micron/125 micron) at the proper height for alignment to the waveguide also shown in FIG. 5.

Previously prepared fiber with aligned handles is registered to the polymer chip by way of the polymer alignment groves for lateral placement. To ensure parallelism of the surfaces of the silicon handle with the chip, reflections of a laser beam off of the two surfaces are observed on a screen at a distance of about 3-8 feet. The laser is mounted just above the sample so that the light is reflected at an angle of about 45 degrees. The Norland-61 is applied to the end of the fiber. The fiber is moved back into place and the coupling is maximized and Norland-61 is cured by UV-light.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for aligning an optical fiber to a handle, comprising:

providing an optical fiber pigtail having a polarization axis, a terminal end and a polished end;

providing a handle having an optically flat surface and a groove adapted to receive and retain said optical fiber;

disposing the polished end of said optical fiber in the groove of the handle;

providing a surrogate chip having a polarization maintaining waveguide propagating light of predetermined polarization;

removably mounting said handle and said surrogate chip on a mount, having a vacuum chuck and a precision fiber rotator, adapted to position said handle and said surrogate chip in parallel planar alignment and with said optical fiber and said waveguide in register;

rotating said optical fiber disposed in said groove with respect to said wave guide to align its polarization axis to a desired orientation with respect to the optically flat surface of said handle; and affixing said aligned optical fiber in said groove of said handle.

* * * * *